(12) United States Patent
Burns et al.

(10) Patent No.: US 6,763,340 B1
(45) Date of Patent: Jul. 13, 2004

(54) MICROELECTROMECHANICAL SYSTEM ARTIFICIAL NEURAL NETWORK DEVICE

(75) Inventors: Daniel J. Burns, Rome, NY (US); David C. Williamson, Holland Patent, NY (US); Mark T. Pronobis, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 817 days.

(21) Appl. No.: 09/668,225

(22) Filed: Sep. 22, 2000

(51) Int. Cl.[7] ............................................. G06N 3/02
(52) U.S. Cl. ............................. 706/26; 706/33; 706/40
(58) Field of Search ........................... 706/26, 33, 40; 365/46

(56) References Cited

U.S. PATENT DOCUMENTS

| | | | |
|---|---|---|---|
| 3,947,828 A | * 3/1976 | Meijer ........................ | 365/46 |
| 5,172,204 A | * 12/1992 | Hartstein .................... | 706/33 |
| 5,204,937 A | * 4/1993 | Minnaja ...................... | 706/40 |
| 5,315,162 A | * 5/1994 | McHardy et al. .............. | 706/33 |
| 6,507,828 B1 | * 1/2003 | Leonard et al. ............... | 706/33 |

OTHER PUBLICATIONS

Makohliso, S.A. et al, A Blomimetic Materials Approach Towards the Development of a Neural Cell?Based Biosensor, Engineering in Medicine and Biology Society , 1996. Bridging Disciplines for Biomedicine. Proceedings of the 18th Annual International Conferen.*

Triffet, T. et al, Transient potentials transmitted by an artificial electrochemical synapse, System Sciences, 1991. Proceedings of the Twenty?Fourth Annual Hawaii International Conference on, Vol: i, 8?11 Jan. 1991, p.:283?289 vol. 1.*

Kurzweil, Raymond, The emergence of true machine intelligence in the twenty?first century (abstract), Proceedings of the 1993 ACM conference on Computer science, Mar. 1993, p. 507.*

* cited by examiner

Primary Examiner—Wilbert L. Starks, Jr.
(74) Attorney, Agent, or Firm—Harold L. Burstyn; Joseph A. Mancini

(57) ABSTRACT

A novel microelectromechanical system artificial neural network (MEMS ANN) device performs the function of a conventional artificial neural network node element. Micromachined polysilicon or high aspect ratio composite beam micro-resonators replace as computational elements the silicon transistors and software simulations of prior-art ANNs. The basic MEMSANN device forms a non-linear (e.g., sigmoid) function of a sum of products. Products of the magnitudes of sine waves, applied to the input drive comb and shuttle magnitudes, are formed in the frequency domain and summed by coupling a plurality of resonators with a mechanical coupling frame, or by integrating them into one resonator. A sigmoid function is applied to the sum of products by shaping the overlap capacitance of the output comb fingers of the resonator. Methods of building and using various single MEMS ANN devices and multi-layered arrays of MEMS ANN circuits are also described. These novel MEMS ANNs exhibit an attractive combination of performance characteristics, compared to conventional hardware ANNs that use silicon transistors or simulations of ANNs running in software on digital computers, including lower cost, simpler design, wider temperature range, greater radiation tolerance, and lower operating and standby power. These advantages favorably impact system weight and size because of reduced shielding, cooling, and power requirements.

26 Claims, 7 Drawing Sheets

MICROELECTROMECHANICAL SYSTEM ARTIFICIAL NEURAL NETWORK DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to an artificial neural network device (ANN) and, in particular, to an ANN embodied in a microelectromechanical system (MEMS). In general, ANNs may be thought of as data processing devices that extract advanced knowledge from complex data. In particular, ANNs can be designed with training methods that use a number of known test cases to effectively teach the ANN to perform a task, for example, to extract features from images, recognize printed text (optical character recognition or OCR) and phonemes/morphemes (speech recognition). They are also used to solve optimization problems and to perform complex, non-linear control functions.

The prior-art ANNs, whether hardware or software, have limitations. Hardware ANNs can be either digital or analog circuits. The basic ANN 'node' element or device produces a non-linear function of a sum of weighted inputs, for example, a sigmoid function of the sum of several products, where each product is an 'input' multiplied by a 'weight'. ANN node elements that perform the base function are often used in configurations consisting of highly interconnected layers of elements.

In a digital hardware ANN network, the inputs and weights are binary numbers stored in registers. Ways of using the network can be micro-coded as operations, such as transfer, multiplication, summing, and other computations, on the binary numbers that represent the inputs and weights. Their output is a binary number stored in a register.

In an analog hardware ANN, the inputs and weights take the form of voltages, currents, or charge packets that vary in magnitude. Special-purpose analog or digital circuits that produce an output voltage perform the multiplications and other computations. The prior art also includes software ANNs implemented as a simulation on a general-purpose digital computer.

One disadvantage of all the prior-art ANNs described above is that they require silicon transistors, either in the digital or analog circuits of hardware ANNs or in the general-purpose digital computer of software ANNs. Embodiments using transistors have restricted operating temperature, typically within a range of 0–70 or −55–+125 degrees Celsius. As the power dissipation of silicon circuitry increases with complexity, supplying power to and removing the heat from very large chips containing millions of transistors is troublesome. Thus routing power supply conductors to such a system and packaging and cooling it are difficult and costly, thereby limiting the system's complexity.

Another disadvantage of prior-art ANNs is that their silicon transistors incorporate insulating dielectric layers, such as silicon dioxide, that are subject to degradation. For example, bulk- and surface-charge generation and trapping may occur in the dielectric layers, especially in devices placed in outer space, where they are subject to continuous ionizing radiation. This degradation can lead to shifts in transistor threshold voltages, and in turn to problems in timing. Eventually, the circuits fail. Likewise, charges generated in these layers can become trapped, causing surface inversion and stray leakage that in turn increase power dissipation and cause catastrophic latch-up, particularly in analog circuits.

Still another limitation has been reported for analog hardware ANNs that represent weights with charge packets of variable size stored internally on a small oxide capacitor. At high temperature the amount of charge may decay slightly with dwell time, necessitating a complex "chip in the loop, bake re-training" procedure that may have to be repeated several times to ensure the ANN's stability. Such a device would be difficult to use in a system that requires built-in training modes to enable it to learn from experience.

OBJECTS AND SUMMARY OF THE INVENTION

An object of the present invention is to provide ANNs at lower cost with simpler design and fabrication, greater temperature range and radiation tolerance, and lower operating and standby power requirements.

A further object of the present invention is to provide ANNs based on MEMS.

Still a further object of the present invention is to provide MEMS ANNs made from micro-machined polysilicon as the operative computational element in the MEMS.

Yet a further object of the present invention is to provide MEMS ANNs whose micro-machined polysilicon or composite beam structure is the operative computational element.

Briefly stated, a novel microelectromechanical system artificial neural network (MEMS ANN) device performs the function of a conventional artificial neural network node element. Micro-machined polysilicon or high aspect ratio composite beam micro-resonators replace as computational elements the silicon transistors and software simulations of prior-art ANNs. The basic MEMSANN device forms a non-linear (e.g., sigmoid) function of a sum of products. Products of the magnitudes of sine waves, applied to the input drive comb and shuttle magnitudes, are formed in the frequency domain and summed by coupling a plurality of resonators with a mechanical coupling frame, or by integrating them into one resonator. A sigmoid function is applied to the sum of products by shaping the overlap capacitance of the output comb fingers of the resonator. Methods of building and using various single MEMS ANN devices and multi-layered arrays of MEMS ANN circuits are also described. These novel MEMS ANNs exhibit an attractive combination of performance characteristics, compared to conventional hardware ANNs that use silicon transistors or simulations of ANNs running in software on digital computers, including lower cost, simpler design, wider temperature range, greater radiation tolerance, and lower operating and standby power. These advantages favorably impact system weight and size because of reduced shielding, cooling, and power requirements.

According to an embodiment of the invention, [$1^{ST}$ INDEPENDENT CLAIM]

According to a feature of the invention, [$2^{ND}$ INDEPENDENT CLAIM]

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
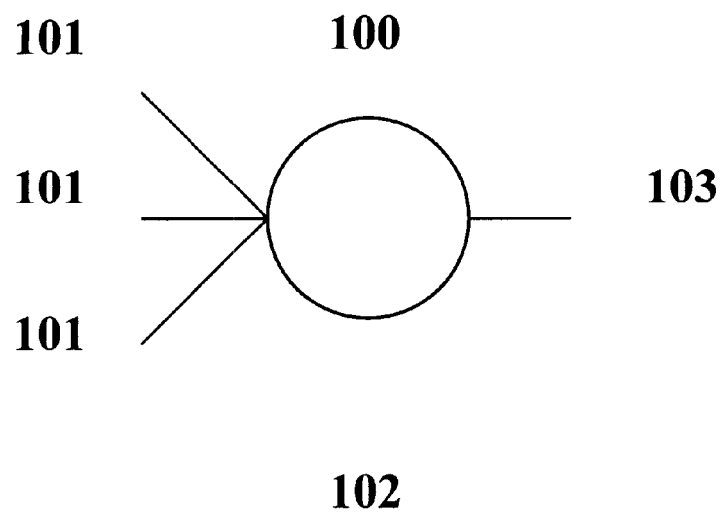
FIG. 1 shows a single node element of an ANN.

Referring to FIG. 1, a classical ANN node element 100 produces an output signal 103 that is a sigmoid function of a thresholded sum of a multiplicity of weighted input signals 101, as shown in Eq. 1, with the threshold term provided by a threshold signal 102.

$$\text{OUT} = \text{Sigmoid}(\text{IN1}*w1 + \text{IN2}*w2 + \text{IN3}*w3 - \text{Threshold}) \quad \text{(Eq. 1)}$$

Figure 2:
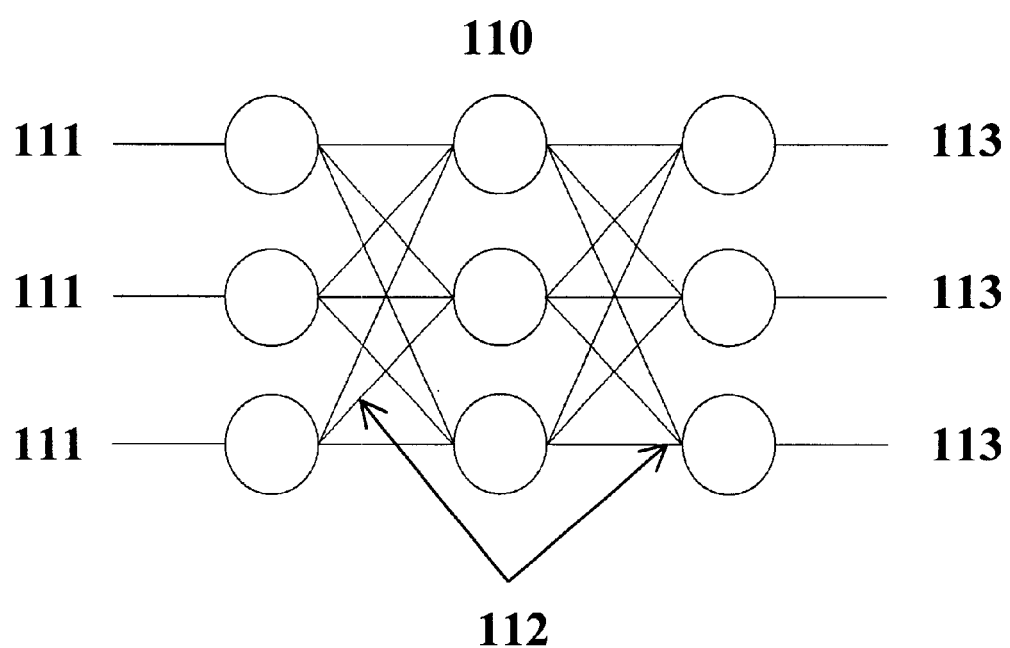
FIG. 2 shows an array of interconnected ANN node elements.

Referring to FIG. 2, a plurality of such classical ANN node elements 100 can be interconnected in an ANN array 110. A plurality of array input signals 111 are sent to ANN array 110, processed, and output as array output signals 113. Array interconnect signals 112 allow the processing in ANN array 110 to occur.

MEMS are micro-machined electromechanical devices that operate in multiple energy domains (e.g., both electrical and mechanical). MEMS devices made from polysilicon or silicon can implement resonators, filters, switches, and variable capacitors. The present invention uses MEMS micro-resonators to implement a computation very similar to that of the prior-art node element of an ANN. MEMS have been used for Signal Processing (U.S. Pat. Nos. 5,537,083 and 5,589,082) and Frequency Signature Sensors (U.S. Pat. No. 5,856,722) but not for ANNs.

Figure 3:
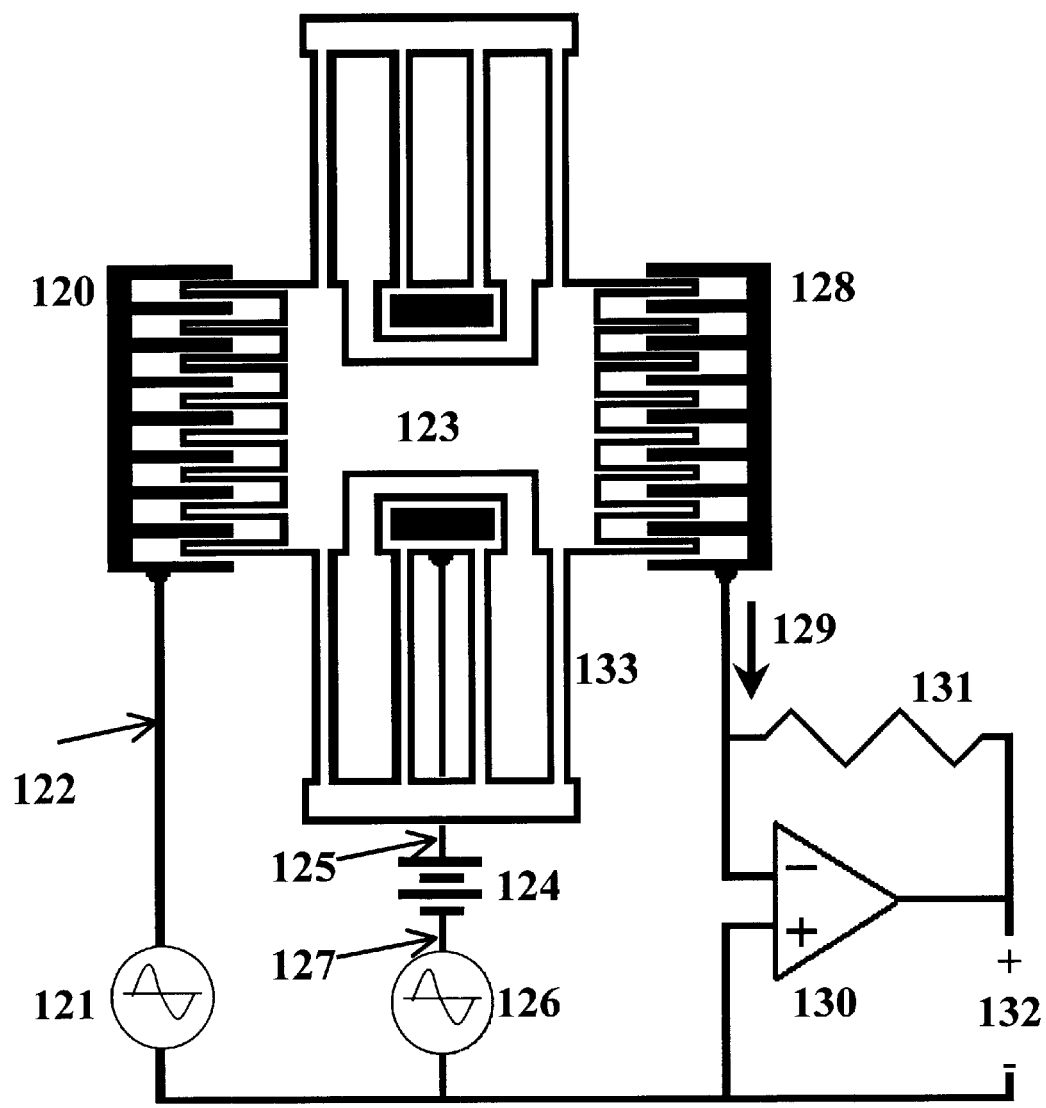
FIG. 3 is a diagram of a MEMS resonator and test circuit.

Referring to FIG. 3, a basic MEMS resonator and an electrical test circuit commonly used to operate it, from the prior art, apply an input drive comb voltage 122 from an input drive comb voltage source 121 to an input drive comb 120. Both a shuttle dc voltage 125, from a shuttle dc voltage source 124, and a shuttle ac voltage 127, from a shuttle ac voltage source 126 are applied to a plate terminal 133. Setting or sweeping frequencies and voltages in the test circuit permits tests that measure parameters that characterize the resonator's performance, such as center frequency and quality factor (C. Nguyen, "Micromechanical Signal Processors", Ph.D. thesis, Univ. Cal. Berkeley, 1991, p. 218).

In its basic mode of operation, a fixed input drive comb 120 is biased with input drive comb voltage source 121, $V_{dac} = |v_d|\cos(wt)$, and a movable shuttle 123 is driven with shuttle dc voltage source 124, $V_{pdc} = 30v$ (typical) in series with shuttle ac voltage source 126, $V_{pac} = 0$. If the drive frequency ($w_d$) of input drive comb voltage source 121, $V_{dac}$, is set to be near the resonant frequency ($w_r$) of the resonator, the central, suspended part of movable shuttle 123 vibrates left and right. This vibrating motion causes a time-varying overlap of the fingers on movable shuttle 123 with respect to the fixed position of the fingers on an output sense comb 128, and thus a varying capacitance between movable shuttle 123 and fixed output sense comb 128. As a result, a current $I_s$ 129 flows from output sense comb 128 into a pre-amplifier 130. Current $I_s$ 129 is transduced to an output voltage $V_S$ 132 by pre-amplifier 130 and a resistor $R_1$ 131. The power spectrum of this waveform is analyzed with methods and equipment described in the prior art, e.g., a hardware or software spectrum analyzer. The prior art of MEMS resonator testing teaches that the power spectrum near $W_d$ may have noise components, arising from parasitic capacitances associated with the drive comb node and test setup, that feed unwanted current to the output node through paths external to the resonator. Such parasitic feed-through confounds attempts to characterize the resonator through electrical measurements. However, a particular test method that solves this problem is also described in the prior art by C. Nguyen, supra, called Electromechanical Amplitude Modulation (EAM). This method adds shuttle ac voltage source 126 ($V_{pac}$) in series with shuttle dc voltage source 124 ($V_{pdc}$) to obtain noise-free measurements of current $I_S$ 129 by shifting, away from $W_d$, the frequency of a component of current $I_s$ 129 that is measured. The fact that the magnitude of this frequency-shifted component that appears at $w_d + w_c$ is proportional to the product of $V_{dac}$ and $V_{pac}$ is central to mapping the function of an ANN to a MEMS. It allows the resonator to form products of ac signals that represent inputs and weights.

Figure 4:
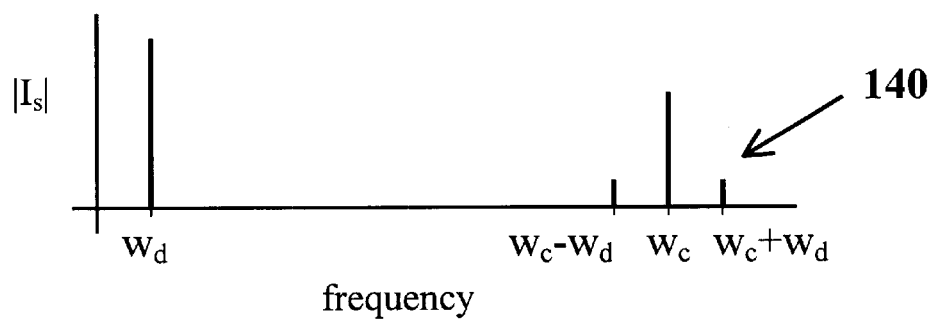
FIG. 4 shows a Fourier spectrum of $I_s$ for a resonator with an input comb driven at frequency $w_d$ and a shuttle driven at frequency $w_c$.

To understand how resonators can implement the basic ANN node function, consider the following example. $V_{dac}$ and $V_{pac}$ are cosine waves, i.e., $V_{dac} = |v_d|\cos(w_d t)$ and $V_{pac} = |v_c|\cos(w_c t)$, and $w_d$ is near the resonance frequency $w_r$. The Fourier spectrum of current $I_S$ 129 will look like FIG. 4. In phasor form, the magnitude of the rightmost component appearing at frequency $w_d + w_c$, i.e., a right-hand-side current component $I_{RHS}$ 140, is:

$$I_{RHS}(jw) = \frac{1}{2} \frac{j(w_d + w_c)|v_d||v_c|V_{pdc}C_1 C_2}{k[1 - (w_d/w_r)^2 + jw_d/(Qw_r)]}. \quad \text{Eq. 2}$$

where $C_1$, $C_2$, K, and Q are constants that depend on design features (C. Nguyen, supra). The magnitude of $I_{RHS}$ depends on the product of $V_d$, $v_c$ and $V_{pdc}$. Also, $W_c$ and $w_d$ appear as components of a multiplier in the numerator. Thus, if the inputs and weights of the ANN node element are mapped onto two of these five factors, the magnitude of $I_{RHS}$ is analogous to one of the product terms in the sum in Eq. 1, e.g., the term IN1 *w1.

Figure 5A:
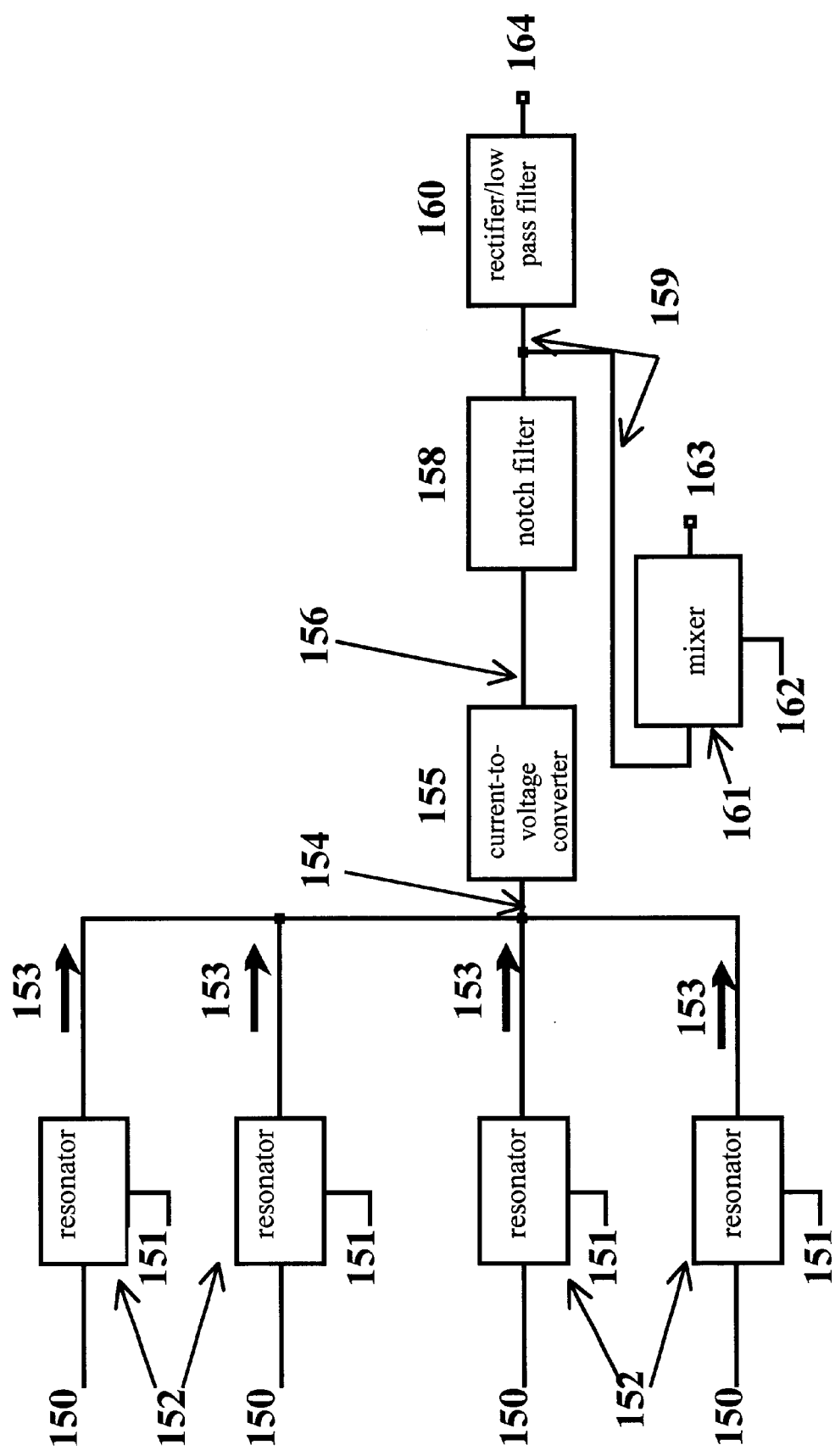
FIG. 5A shows a schematic block diagram of a MEMS ANN node element.
Figure 5B:
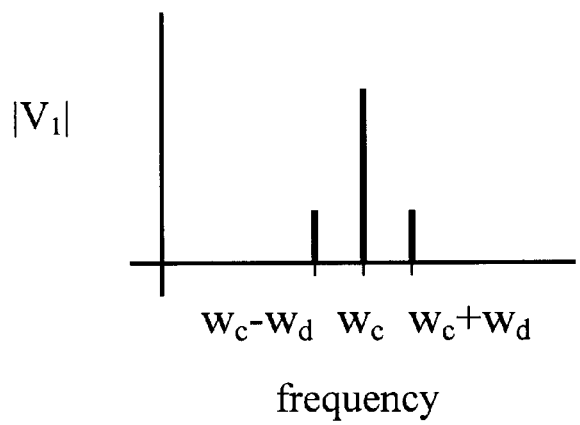
FIGS. 5B, 5C, and 5D show Fourier spectra of signals produced at different stages of a MEMS ANN node element.
Figure 5C:
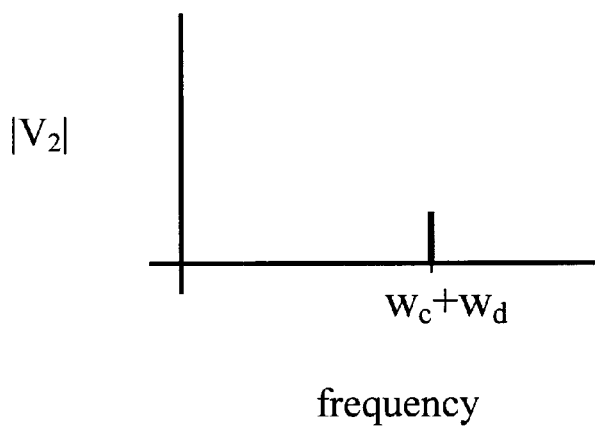
Figure 5D:
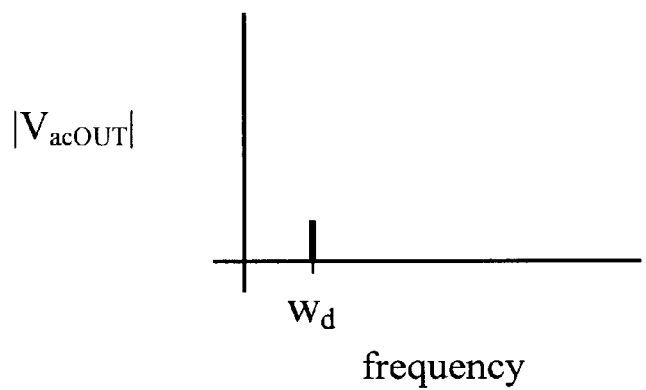

Referring to FIG. 5A, a plurality of MEMS ANN resonators 152 can produce product terms, as well as the threshold term in Eq. 1, from MEMS ANN input signals 150 and MEMS ANN weight signals 151. Further, a current $I_{OUTn}$ 153 from each MEMS ANN resonator 152 can be summed in a number of ways taught in the prior art. To use, or read out, the output of the MEMS ANN, the $I_{RHS}$ component must be extracted from the overall Fourier spectrum of $I_S$, and an output voltage signal must be produced for driving other devices, e.g., other MEMS ANN inputs in a layered circuit. This is accomplished by transforming a summed current $I_{SUM}$ 154 to a voltage $V_1$ 156 with a current-to-voltage converter 155 and isolating the frequency component of interest with a MEMS notch filter 158, also described by Nguyen, supra. The result is a voltage $V_2$ 159. FIG. 5B is a graph of the Fourier spectrum of voltage $V_1$ 156, and FIG. 5C is a graph of the Fourier spectrum of voltage $V_2$ 159. A rectifier/low pass filter 160 changes voltage $V_2$ 159 into a dc analog output voltage $V_{dcOUT}$ 164, similar to the output of a conventional ANN, on nodes that go off-chip to be interpreted by the system. Finally, a mixer 161 uses a mixer frequency 162 to shift the frequency of voltage $V_2$ 159 to whatever frequency drives subsequent stages of devices, e.g., a frequency $w_d$. The result is an ac analog output voltage $V_{acOUT}$ 163; FIG. 5D shows a graph of its Fourier spectrum. Mixer 161 can also be implemented as a MEMS resonator.

To complete the analogy with the ANN node element, the summed output must be transformed by a sigmoid function, as in Eq. 1. A special-purpose analog circuit can carry out this transformation, as described in the prior art. However, a better result comes from a design feature of the resonators. Shaping the input drive comb of a resonator tailors the force-against-voltage profile to extend the range of shuttle motion (see W. Yo, S. Mukheijee, and N. McDonald, "Optimal Shape Design of an Electrostatic Comb Drive in Microeletromechanical Systems", 7 *JMEMS* (1), 16–26 (March 1998)). The output sense comb can likewise be shaped to produce a sigmoid output current-against-motion function. Shaping input or output combs can also produce other functions.

Figure 6:
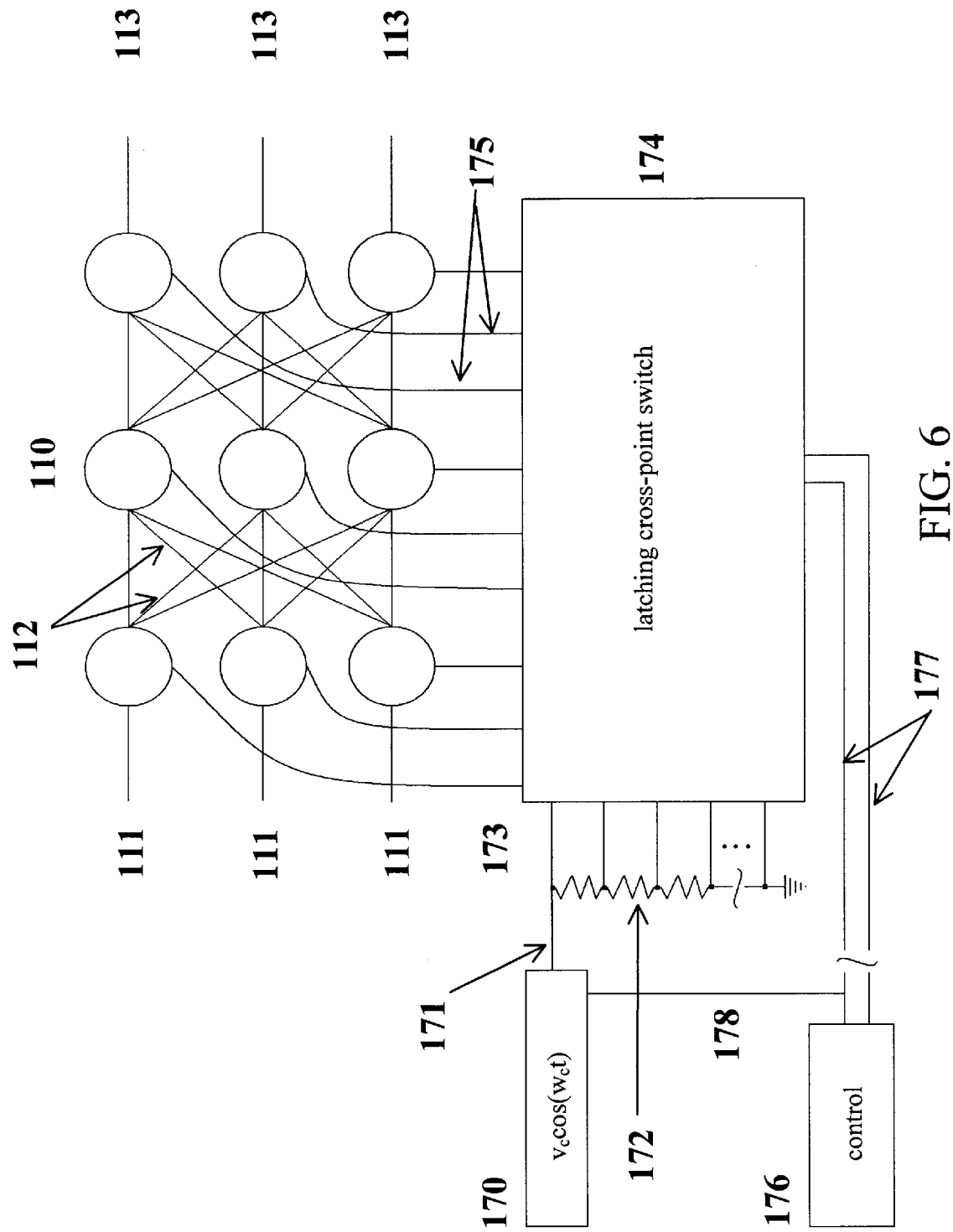
FIG. 6 shows an array of MEMS ANN node elements whose weights are coded as $v_d$ and $v_c$ voltages, with weight generation/control scheme.

One application of the embodiment described above is in an array of MEMS ANN devices as illustrated in FIG. 6. The values of array input signals 111 to MEMS ANN array 110 node elements correspond to the peak-to-peak amplitudes of $V_{dac}$ that are sine waves at frequency $w_d$. Array input signals 111 can come from sensors that modulate a sine wave in amplitude. Weight signals 175 correspond to the peak-to-peak amplitudes of $V_{pac}$ of frequency $w_c$, supplied from a sine wave generator 170 that produces a sine wave signal 171, a stepped attenuator 172 that taps off various magnitudes, and a latching cross-point switch 174, all of which reside either on- or off-chip. Voltage signals 173, for example, called $v_{c1}$, $v_{c2}$, and $v_{c3}$, can be sine waves of 10.0v, 9.9v, and 9.8v respectively. The column outputs of latching cross-point switch 174 are routed to the resonator shuttle terminals in ANN array 110. A control 176 provides whatever control signals are need for sine wave generator 170 and latching cross-point switch 174, e.g. a sine wave generator control signal 178 and cross-point switch control signals 177.

MEMS micro-switches are currently under development. Until they are available, the signals representing weights can be generated and switched off-chip by prior-art methods. Or the cross-point switches can be implemented with conventional transistor circuitry, such as transmission gates controlled by flip-flops. The cross-point switch, rather than simply providing a separate resonator of fixed (weight) value to each MEMS ANN, enables a trainable mode of operation. The output of each of the MEMS ANNs on the first layer would then be a sine wave at frequency ($w_d$+$w_c$). To maximize the magnitude of the motion response, and hence the output comb current of the product-forming resonators, $w_d$ and $w_c$ should be chosen so that ($w_d$+$w_c$)=$w_r$, where $w_r$ is the resonant frequency of the product-forming resonators on the first layer. For example, if $w_d$=$w_c$=$w_r$/2, then ($w_d$+$w_c$)=$w_r$. The mixer in the first-layer MEMS ANNs could shift its input signal from frequency ($w_d$+$w_c$)=$w_r$ down to frequency $w_d$=$w_r$/2, thereby providing an output to drive other MEMS ANNs on the next layer with the same $w_r$ as those on the first layer. Other embodiments that employ different $w_d$, $w_c$, and $w_r$ frequencies and phases on different layers are within the scope of the present invention.

Figure 7:
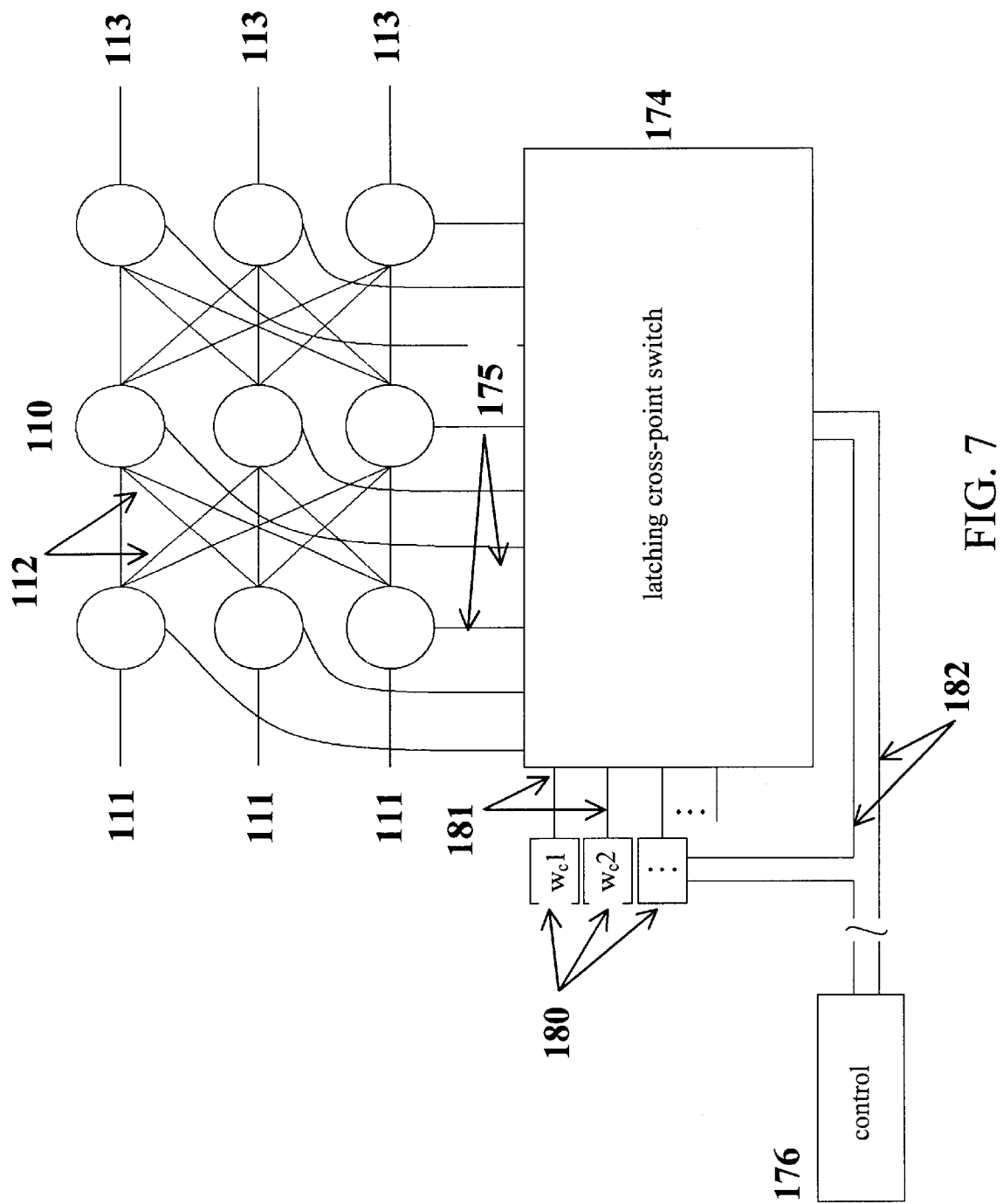
FIG. 7 shows an array of MEMS ANN node elements whose weights are coded as $w_d$ and $w_c$ frequencies, with weight generation/control scheme.

Another embodiment of the MEMS ANN device of the present invention is illustrated in FIG. 7. Here the ANN input values 111 correspond to the values of the input drive signal frequencies $w_d$n, and the values of the weights 175 correspond to the values of the shuttle ac signal frequencies, $w_c$n. Here again, the weight generation and storage can be implemented as an array of self-oscillating resonators, or frequency generators 180, each with a different $w_r$, that send frequency signals 181 through latching cross-point switch 174 to the MEMS ANNs in a layered ANN array 110, enabling a trainable mode of operation. Control 176 provides frequency generators 180 and latching cross-point switch 174 with control signals 182. In this embodiment, the output again corresponds to the magnitude of the component of current $I_S$ that appears at the sum frequency $w_d$+$w_c$. But here both frequencies depend on the values of the inputs and weights. The desired effect is the multiplication of factors in the numerator of Eq. 2 to form the products. But the denominator of Eq. 2 also changes according to the ratio of $w_d$ to $w_r$, thereby changing the magnitude of the output. However, the change is similar to that of a sigmoid, i.e., the $I_{RHS}$ magnitude increases non-linearly as $w_d$ approaches $w_r$. This effectively combines the multiplication with a non-linear transformation, potentially simplifying the MEMS ANN design by taking the place of the sigmoid transformation. Although the predicted form of the dependence is not exactly a sigmoid transformation, it may be close enough for proper training and operation. In this case, the frequencies $w_d$ and $w_c$ are chosen such that the sum ($w_d$+$w_c$) spans the rising part of the resonator's resonance curve from just below $w_r$ to $w_r$.

Other mappings of inputs and weights to resonator drive parameters are possible within the scope of the present invention, thereby allowing the combination of different types of sensors that modulate ac voltage, dc voltage, phase, or frequency.

Another embodiment within the scope of the present invention is to produce an output by optical means. For example, an LED, laser diode, or other light source can illuminate a portion of the shuttle along an edge. Different magnitudes of the shuttle's motion reflect different amounts of light. Measuring the intensity of the reflected light reads out the magnitude of the shuttle's motion.

Referring again to Eq. 1 and the discussion relating to FIG. 5A about how to sum a multiplicity of products, one can sum current $I_{OUTn}$'s 153 from MEMS ANN resonators 152 that form the different products with one or more operational amplifiers. One can also connect together electrically to the same node all sense-comb outputs from MEMS ANN resonators 152. Another embodiment within the scope of the present invention is to sum by mechanical coupling the motions of the output of multiple product-forming resonators in a MEMS ANN and to transmit the motions directly to the shuttles of other MEMS ANN devices. In such an embodiment, current-to-voltage converter 155 that contains silicon transistor circuitry, MEMS notch filter 158, and mixer 161 would be unnecessary. However, the second-stage MEMS ANN devices would have to exhibit maximum motion at frequency ($w_d$+$w_c$). This embodiment is especially useful in a surface micro-machined polysilicon process, where different product terms must be produced with different resonators.

Still another embodiment connects the multiple shuttles together mechanically by a coupling frame of beams, and senses the summed motions with an output sense comb connected to one of the shuttles or to the coupling frame. In another embodiment the moving shuttle output comb fingers of a set of multiple resonators share a single fixed-output sense comb. These embodiments, and others for summing multiple output currents or motions, are especially useful in surface micro-machined processes, where all fingers on the moving shuttle are shorted together because they are all formed in the same continuous polysilicon layer.

Still another embodiment is to fabricate a resonator by the Carnegie-Mellon University (C-MU) High Aspect Ratio MEMS (HARM) process. In this process one connects subsets of the fingers on the fixed-input drive comb to different input signals; and subsets of the fingers on the movable shuttle input comb, to different weight signals. These connections are possible in the HARM process because the electrical connections to individual fingers or sets of fingers on the moving shuttle can be wired with patterned polysilicon, metal 1, and metal 2 interconnections. This HARM process is preferred to the surface micro-machined polysilicon process, where all fingers on the moving shuttle are shorted together, because they are all formed in the same continuous polysilicon layer.

We have fabricated MEMS resonators and verified that the effects predicted by Eq. 2 do occur, thus showing that physical MEMS ANNs function. We have also simulated MEMS ANNs to verify that they work as described. For example, we constructed a software simulator in which we apply inputs and weights to a traditional ANN and a MEMS ANN side-by-side to compare their outputs. The simulator allows us to map inputs and weights onto various combinations of values of $v_d$, $v_c$, $w_d$, and $w_c$ for the case of a simplified, single-input ANN, with no threshold, summing, or sigmoid transformation. With this simulator we have established the ranges of values of the MEMS ANN parameters that correspond to the range 0 to 1 often used for traditional ANN inputs and weights.

The feasibility of a stepped attenuator that supplies weights mapped to voltages is obvious. The design of an array of resonators, each with a slightly different frequency, to map inputs and weights to frequencies is more difficult. Our simulations have taught us that, besides having different resonant frequencies (F0), all resonators must have similarly shaped resonance curves to avoid output current scaling. This requirement imposes constraints on quality factor (Q) and the maximum motion magnitude ($x_{max}$) and makes design an optimization problem that requires adjustment of multiple resonator physical dimensions. Such a problem can be solved by methods from the prior art. T. Mukheijee at C-MU has worked on a similar problem: the optimal design of accelerometers. After studying the sensitivity of resonant frequency, Q, and motion magnitude to physical design dimensions for a typical resonator we constructed a simple design algorithm that optimizes these outputs by adjusting three physical design dimensions. Using this approach, we have designed arrays of resonators that span a 20% range in resonant frequency while substantially preserving Q and $x_{max}$.

Figure 8:
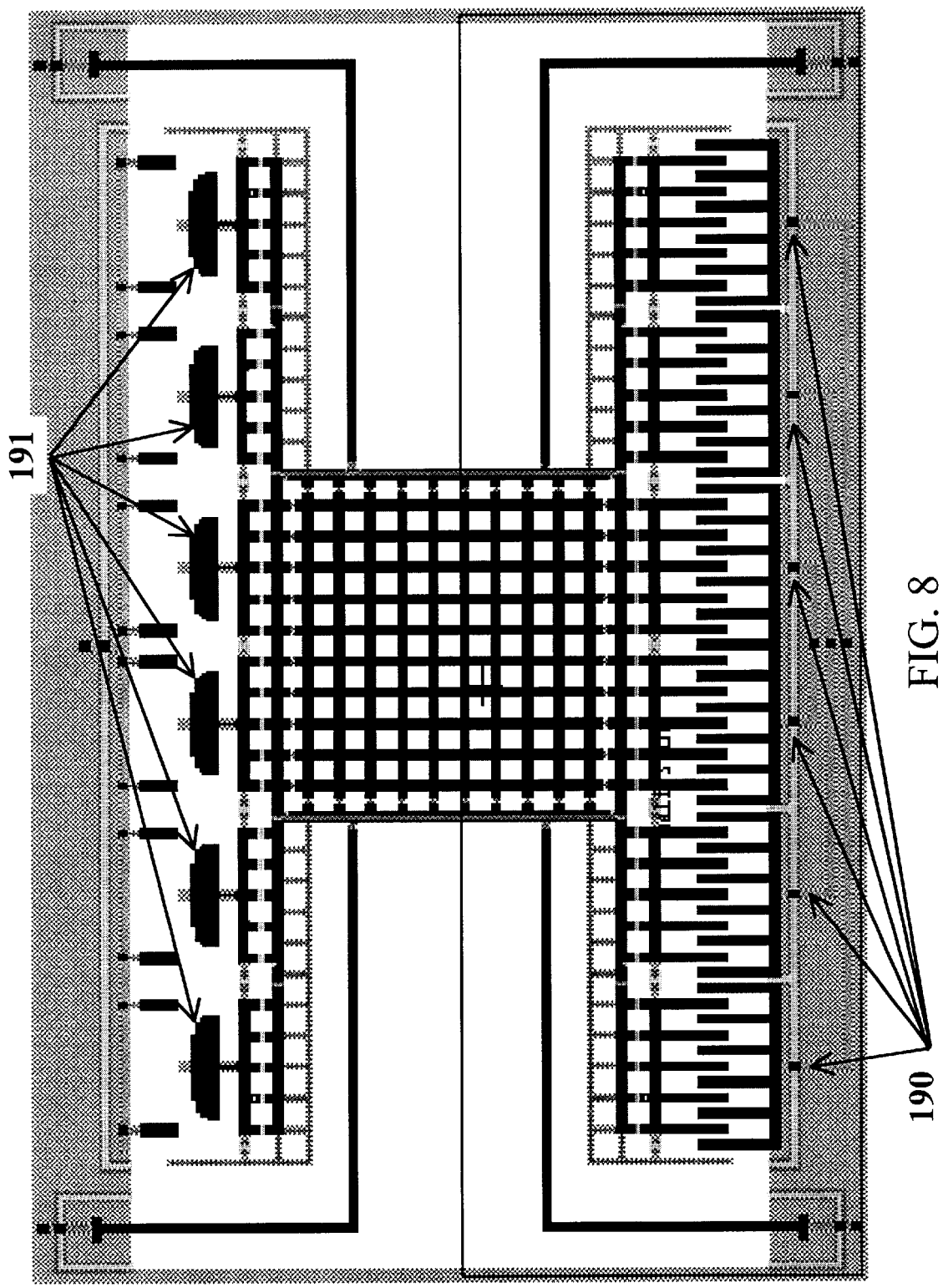
FIG. 8 shows a three-input MEMS ANN with shaped output combs for applying a sigmoid transformation to the output, implemented in a composite-beam, complementary metal oxide semiconductor (CMOS) technology.

We have also submitted for fabrication a preliminary design for a three-input MEMS ANN that will be available for testing. FIG. 8 shows the layout of this device, which incorporates shaped output combs 191 to evaluate the method of the present invention for applying a sigmoid transformation of inputs 190 to the output.

In summary, ANN devices implemented in MEMS technologies, and circuits comprising a multiplicity of MEMS ANN devices, are feasible. They exhibit an attractive combination of characteristics compared to conventional ANNs. The advantages include lower cost, simpler design, smaller area, greater temperature range and radiation tolerance, and, very importantly, lower operating and standby power. These significant advantages in performance arise from micro-mechanical resonators made from micro-machined polysilicon as the operative computational element in the MEMS ANN, as opposed to active devices such as the silicon transistors found in conventional digital or analog ANN circuitry.

In general, the ability to implement ANNs in MEMS technology represents a novel computing paradigm not previously available to MEMS system designers. This paradigm is especially valuable for higher-order signal and data processing on very small sensor platforms, with very little-power, and perhaps at high temperatures with little cooling. Power dissipation in MEMS ANN structures is very small. Nguyen, supra, has shown that the equivalent impedances of practical MEMS resonators can be very high, e.g., series resistance of megohms ($10^6$), capacitances of only femto-Farads ($10^{-15}$), and inductances on the order of tens of kiloHenries ($10^5$). Such impedances imply operating currents on the order of nanoamperes and power dissipation on the order of a few nanowatts per resonator. With such low-power dissipation, many MEMS ANNs can be placed on a single chip.

A whole MEMS ANN chip can be constructed without any silicon transistors; a very few self-oscillating resonators could be off-chip. Operating temperatures can be very high, as polysilicon resonators operate at many hundreds of degrees C. For example, in addition to standard polysilicon and CMOS aluminum resonators, others have built MEMS resonators with very high temperature materials, e.g., silicon carbide (Case Western Reserve University, 400C+), and nickel (University of Michigan). As noted above, alternatives for mapping ANN inputs and weights onto various combinations of $v_d$, $v_c$, $V_{pdc}$, $w_c$, and $w_d$ accommodate input signals from a variety of sensors that modulate ac and dc voltage and sine wave frequency.

Also, MEMS ANN circuits that are not trainable, but rather have fixed weights, can be constructed within the scope of the present invention. In this embodiment, depending on its form, the stepped attenuator, or array of different frequency resonators, and the cross-point switch and associated wiring that supply weights to the MEMS ANNs in an array can be replaced with a free-running resonator oscillator that supplies a weight value locally at each MEMS ANN. This replacement adds silicon transistors at each node to support self-oscillation. The weights cannot be changed unless the oscillators are tunable. (Thermal and electrical methods for tuning MEMS resonators have been discussed in the prior art.) Even without tuning, ANNs with fixed weights are useful where training can be done off-line and continued learning during system operation is not important. For example, a circuit for calculating fixed mathematical functions of a set of inputs can be built with weights that do not change.

U.S. Pat. No. 5,537,083, "Microelectromechanical Signal Processors", teaches how to construct 'signal processors'. These devices couple, with a beam or beams, two or more MEMS resonators at one point on each resonator, and they take advantage of the dynamics of certain box-shaped coupling spring structures to make higher-order filters. In the present invention, the preferred embodiment uses a symmetrically shaped coupling frame that connects to two points on the source resonators to produce a purely additive summation of motion.

Another feature suggested in the preferred embodiment of the present invention is to shape the output comb to apply a non-linear transform to the sum-of-products output. While this shaping resembles the method suggested in the prior art to shape the input drive comb to tailor its force-against-displacement relation, the intent is quite different, i.e., to apply a nonlinear transform to the output current-against-displacement relation of the output comb.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A microelectromechanical artificial neural network node element effective for computing a modified sum-of-products function, comprising:
   a rigid mass;
   at least one product-forming microelectromechanical resonator, whereby a product is formed by multiplying at least one input by at least one weight;
   said at least one resonator further comprising:
      an input drive comb fixedly connected to said rigid mass;
      a movable shuttle flexibly connected to said rigid mass; and
      an output sense comb connected to said rigid mass;
   means for transmitting an electro-mechanical signal to said input drive comb and said movable shuttle, wherein said signal includes at least one input and at least one weight;
   means for sensing a response to said signal from said at least one resonator;
   means for producing a sum of said responses and
   means for applying a transformation function to said sum.

2. The device of claim 1, wherein said electro-mechanical signal further comprises:
   a combination of periodic alternating voltages and constant voltages applied to said input drive combs; and
   a combination of periodic alternating voltages and constant voltages and mechanical forces applied to said movable shuttles.

3. The device of claim 1, wherein said means for producing is a set of wires connected from said output sense combs to an operational amplifier configured as a current-to-voltage converter.

4. The device of claim 1, wherein said means for producing is a coupling frame comprising at least one beam connecting said movable shuttles.

5. The device of claim 3, wherein an output of said current-to-voltage converter is connected to a notch filter that produces an isolated subset of at least one component from the frequency spectrum of said sum responses.

6. The device of claim 5, wherein said notch filter is connected to a mixer effective for shifting a frequency of said isolated subset.

7. The device of claim 5, wherein said notch filter is connected to a rectifier/low pass filter that produces a constant voltage proportional to the power of said notch filter's output.

8. The device of claim 1, wherein first signals applied to said input drive combs are sine waves of predetermined first frequencies, predetermined first magnitudes, and predetermined first phases that represent input values;
   second signals applied to said movable shuttles are sine waves of predetermined second frequencies, predetermined second magnitudes, and predetermined second phases, each in series with a predetermined constant voltage that represents weights; and
   a sum of products of inputs multiplied by weights is the magnitude of the shuttle motion.

9. The device of claim 1, wherein first signals applied to input drive combs are sine waves of predetermined first frequencies, predetermined first magnitudes, and predetermined first phases that represent input values;
   second signals applied to said movable shuttles are sine waves of predetermined second frequencies, predetermined second magnitudes, and predetermined second phases, each in series with a predetermined constant voltage that represents weights; and
   a sum of products of inputs multiplied by weights is the magnitude of output sense comb current power spectrum components that appear at the sums of said first frequencies and said second frequencies.

10. The device of claim 8, wherein a set of predetermined periodic mechanical forces substitutes for said first or said second signals;
    first stimuli applied to said input drive combs are sine waves of a predetermined first voltage, a predetermined set of first frequencies, and predetermined first phases that represent input values;
    second stimuli applied to said movable shuttles are sine waves of a predetermined second voltage, and a predetermined set of second frequencies, and predetermined second phases, or a set of predetermined periodic mechanical forces, that represent weight values, each in series with a predetermined constant voltage; and
    a sum of products is the magnitude of the shuttle motion or output sense comb current power spectrum components appearing in a band of frequencies ranging from the minimum to the maximum of the set of sums of said first frequencies and said second frequencies.

11. The device of claim 9, wherein a set of predetermined periodic mechanical forces substitutes for said first or said second signals.

12. The device of claim 1, wherein said means for applying is an input or output sense comb with a set of shaped movable and/or fixed comb fingers that substantially provide a sigmoid capacitance against a displacement.

13. The device of claim 1, wherein said means for sensing and said means for producing sense electromagnetic radiation modulated by said movable shuttles.

14. The device of claim 1 fabricated using at least one micromachining process acting upon a substrate of at least one layer of polysilicon, at least one high-aspect-ratio composite beam, bulk silicon, or plastic.

15. An array of devices as in claim 8, wherein said predetermined set of second signals comprises the output of a cross-point switch that establishes electrical connections between a set of sine wave sources whose magnitudes represent weights and the input comb and/or shuttles of product forming resonators of devices in said array.

16. An array of devices as in claim 8, wherein said predetermined set of second signals comprises a cross-point switch that establishes electrical connections between a set of sine wave sources whose frequencies represent weights and the input comb and/or shuttles of product forming resonators of devices in said array.

17. An array of devices as in claim 9, wherein said predetermined set of second signals comprises the output of a cross-point switch that establishes electrical connections between a set of sine wave sources whose magnitudes represent weights and the input comb and/or shuttles of product forming resonators of devices in said array.

18. An array of devices as in claim 9, wherein said predetermined set of second signals comprises a cross-point switch that establishes electrical connections between a set of sine wave sources whose frequencies represent weights and the input comb and/or shuttles of product forming resonators of devices in said array.

19. An array of devices as in claim 4, wherein outputs of devices on an nth layer are connected to inputs of devices on an (n+1)th layer by means of said coupling frame.

20. An array of devices as in claim 10, wherein outputs of devices on an nth layer are connected to inputs of devices on an (n+1)th layer.

21. An array of devices as in claim 11, wherein outputs of devices on an nth layer are connected to inputs of devices on an (n+1)th layer.

22. An array of devices as in claim 15, wherein outputs of devices on an nth layer are connected to inputs of devices on an (n+1)th layer.

23. An array of devices as in claim 16, wherein outputs of devices on an nth layer are connected to inputs of devices on an (n+1)th layer.

24. An array of devices as in claim 17, wherein outputs of devices on an nth layer are connected to inputs of devices on an (n+1)th layer.

25. An array of devices as in claim 18, wherein outputs of devices on an nth layer are connected to inputs of devices on an (n+1)th layer.

26. A method of computing a modified sum-of-products function in a microelectromechanical system, comprising the steps of:

transmitting an electromechanical signal to at least one input drive comb and at least one movable shuttle, said signal including at least one input and at least one weight;

sensing a response to said signal from at least one resonator, said resonator being a component of said microelectromechanical system and comprising at least one input drive comb and at least one movable shuttle;

if said microelectromechanical system comprises more than one resonator, producing a sum of responses from all said resonators; and applying a transformation function to said response or said sum.

* * * * *